(12) United States Patent
Schueren

(10) Patent No.: US 7,786,685 B2
(45) Date of Patent: Aug. 31, 2010

(54) LINEAR MOTOR AND METHOD FOR OPERATING A LINEAR MOTOR

(75) Inventor: Volker Schueren, Marktheidenfeld (DE)

(73) Assignee: Bosch Rexroth AG, Stuttgart (DE)

( * ) Notice: Subject to any disclaimer, the term of this patent is extended or adjusted under 35 U.S.C. 154(b) by 0 days.

(21) Appl. No.: 11/887,089

(22) PCT Filed: Mar. 22, 2006

(86) PCT No.: PCT/EP2006/002630

§ 371 (c)(1),
(2), (4) Date: Dec. 4, 2008

(87) PCT Pub. No.: WO2006/100057

PCT Pub. Date: Sep. 28, 2006

(65) Prior Publication Data

US 2009/0091276 A1   Apr. 9, 2009

(30) Foreign Application Priority Data

Mar. 23, 2005   (DE) .................. 10 2005 013 349

(51) Int. Cl.
*H02K 41/02* (2006.01)
(52) U.S. Cl. .............. 318/135; 318/687; 310/12.01; 310/12.04; 310/12.05; 310/13
(58) Field of Classification Search ............ 318/135, 318/687, 671; 310/12, 13, 12.05, 12.04
See application file for complete search history.

(56) References Cited

U.S. PATENT DOCUMENTS

| | | | | |
|---|---|---|---|---|
| 3,768,417 A | * | 10/1973 | Thornton et al. | 104/282 |
| 3,803,466 A | * | 4/1974 | Starkey | 104/292 |
| 4,151,431 A | * | 4/1979 | Johnson | 310/12.24 |
| 4,460,855 A | * | 7/1984 | Kelly | 318/135 |
| 4,535,278 A | * | 8/1985 | Asakawa | 318/687 |
| 4,555,650 A | * | 11/1985 | Asakawa | 318/135 |
| 4,613,805 A | * | 9/1986 | Matsuo et al. | 318/687 |
| 4,760,294 A | * | 7/1988 | Hansen | 310/13 |
| 4,897,582 A | * | 1/1990 | Otten et al. | 318/135 |
| 5,023,495 A | * | 6/1991 | Ohsaka et al. | 310/12.15 |
| 5,175,455 A | * | 12/1992 | Penicaut | 310/12.25 |

(Continued)

FOREIGN PATENT DOCUMENTS

DE   27 10 156   9/1978

(Continued)

OTHER PUBLICATIONS

International Search Report, PCT International Patent Application No. PCT/EP2006/002630, dated Jul. 19, 2006.

(Continued)

*Primary Examiner*—Rita Leykin
(74) *Attorney, Agent, or Firm*—Kenyon & Kenyon LLP

(57) ABSTRACT

A linear motor includes a primary part arranged as a guideway stator and at least one secondary part that is movable with respect to the primary part, the at least one secondary part having device(s) for controlling the generation of a magnetic field, causing its motion, in the primary part. It is possible to avoid costly control devices for the application of current to the stator.

17 Claims, 3 Drawing Sheets

U.S. PATENT DOCUMENTS

| | | | |
|---|---|---|---|
| 5,225,725 A * | 7/1993 | Shiraki et al. | 310/12.19 |
| 5,270,631 A * | 12/1993 | Takahashi et al. | 318/135 |
| 5,282,424 A * | 2/1994 | O'Neill | 104/282 |
| 5,289,088 A * | 2/1994 | Andoh | 318/135 |
| 5,628,252 A * | 5/1997 | Kuznetsov | 104/284 |
| 5,703,417 A * | 12/1997 | Kelly | 310/12.21 |
| 5,801,462 A * | 9/1998 | Yagoto et al. | 310/12.19 |
| 5,965,963 A * | 10/1999 | Chitayat | 310/12.01 |
| 6,037,680 A * | 3/2000 | Korenaga et al. | 310/12.22 |
| 6,037,739 A * | 3/2000 | Hartramph et al. | 318/687 |
| 6,326,708 B1 * | 12/2001 | Tsuboi et al. | 310/12.06 |
| 6,411,049 B1 | 6/2002 | Fischperer | |
| 6,713,900 B2 * | 3/2004 | Yamada | 310/12.05 |
| 6,917,126 B2 * | 7/2005 | Tsuboi et al. | 310/12.04 |
| 6,952,086 B1 * | 10/2005 | Krefta et al. | 318/135 |
| 7,385,363 B2 * | 6/2008 | Schemm | 318/135 |
| 2007/0013328 A1 | 1/2007 | Shemm | |

FOREIGN PATENT DOCUMENTS

| | | |
|---|---|---|
| DE | 39 00 511 | 7/1990 |
| DE | 199 22 441 | 11/2000 |
| DE | 103 34 736 | 2/2005 |
| EP | 0 301 164 | 2/1989 |

OTHER PUBLICATIONS

Written Opinion of the International Searching Authority, PCT International Patent Application No. PCT/EP2006/002630, dated Jul. 19, 2006 (English-language translation provided).

J. Hirai et al., "Wireless Transmission of Power and Information and Information for Cableless Linear Motor Drive," IEEE Transactions on Power Electronics, IEEE Service Center, Piscataway, NJ, vol. 15, No. 1, Jan. 2000, XP011043386, ISSN: 0885-8993.

\* cited by examiner

LINEAR MOTOR AND METHOD FOR OPERATING A LINEAR MOTOR

FIELD OF THE INVENTION

The present invention relates to a linear motor having a primary part developed as a guideway stator and at least one secondary part, as well as a method for operating a corresponding linear motor.

BACKGROUND INFORMATION

Linear motors which work according to the synchronization principle have a primary part developed as a guideway stator on which a secondary part is situated in a freely movable manner. For the propulsion of the secondary part, a traveling magnetic field is generated which moves the secondary part, that is developed using magnets, along by magnetic reciprocal action.

The generation of the traveling field in the stator windings takes place by feeding in a three-phase current of variable frequency which determines the speed of the motion.

The guideway stator is subdivided into individual segments, which each have connected windings. At the connecting points of the segments current-supplying devices are situated, which respectively apply current to the connected segments, which is necessary for the motion.

This form of construction requires a costly design and control of the individual current-supplying devices.

For instance, in German Published Patent Application No. 39 00 511, a linear motor is described having a primary part that has stator poles arranged in series and a secondary part that is movable alongside the primary part.

The coils of the guideway stator have current applied to them by power converters whose frequency and amplitude are controllable by an electronic controller which takes into account the current residence locale of the secondary part, in order to move the secondary part on the primary part. For the propulsion, segments of the primary part are supplied with current by the external control device, whereupon all the secondary parts, which are on one segment of the primary part at this time, move away uniformly.

German Published Patent Application No. 199 22 441 describes a method and a device for operating a magnetic vehicle having a synchronous guideway stator linear motor. A costly, controller is described which controls the supplying of current to the individual winding sections, and with that also the propulsion of the secondary parts. Secondary parts which are located in a similarly controlled region, that can also be composed of several winding sections or segments, are in turn moved away uniformly.

The suitable energizing of the coils or windings of the stator is connected with great expenditure, especially if several secondary parts are supposed to move independently of one another on a guideway stator, which can also be an extended rail system. Oppositely directed propulsion of secondary parts is not possible within one stator segment in the shown related art.

SUMMARY

Example embodiments of the present invention provide a simple control for applying current to stator windings.

A linear motor according to example embodiments of the present invention, which is particularly able to work according to the synchronization principle, has a primary part arranged as a guideway stator and at least one secondary part, that is movable with respect to the primary part, which has device(s) for controlling the generation of a magnetic field, causing its propulsion, in the primary part. It is therefore possible to avoid costly control devices associated with the guideway stator for supplying current to the stator windings. A spatially distributed magnetic alternating field that moves along the stator, the so-called traveling field, is required for the propulsion of the secondary part.

A linear motor according to example embodiments of the present invention may be provided with a primary part having a number of side-by-side mounted individual coils, the individual coils being able to have current applied to them independently of one another for the generation of a magnetic field, the magnetic field causing the motion of the at least one secondary part being generated in the primary part using the application of current to the individual coils. This permits applying current only to the individual coils that are located in the immediate vicinity or within the sphere of influence of the at least one secondary part, and with that, an independent motion of the secondary parts.

The at least one secondary part of a linear motor may control the generation of the magnetic field, causing its motion, in the primary part, using a control field distributed along the propulsion direction. The control field corresponds to a setpoint field and can be determined either by a control device that is located on the secondary part or can be supplied to the secondary part from the outside. It may portray spatially the drive field required for the propulsion, and is therefore an alternating field, in particular, a sinusoidal alternating field.

The control field provided by the at least one secondary part of the linear motor may be locally measured when associated with a single coil, and the measured value is used as the current setpoint value for this individual coil. In the case of a magnetic control field, there is the option of assigning magnetic field sensors to the individual coils.

The at least one secondary part may provide a magnetic field as the control field. This provided magnetic field can be detected in a simple manner by magnetic field sensors, such as Hall sensors, that are positioned along the primary part. The strength of the detected magnetic field is used as the current setpoint value for applying current to the individual coil.

This magnetic control field can be generated by transmitting coils situated on the secondary part. The shape (for instance, sinusoidal) of the control field is determined by an appropriate design and the suitable positioning of the transmitting coils. The feed force is a function of the strength of the drive field, which is determined by the amplitude of the control field. In this example embodiment, the signal processing on the secondary part only has to provide one unidimensional setpoint current value, and inject this as exciting current into the transmitting coils. This results in a drive field generated by the individual coils of the stator within the sphere of influence of the secondary part.

The at least one secondary part of a linear motor may make available an electrical field as control field. An electrical field can be used to avoid in a simple manner the influence on the detection by the magnetic drive field.

In an example embodiment of a linear motor, the generation of the magnetic field causing the motion may be controlled in the primary part using electromagnetic waves that are, in particular, modulated. The wavelength and/or the polarization of the electromagnetic waves may be used for the control. In this context, the sign of the setpoint current can be represented particularly by different wavelengths or directions of polarization.

In a method for operating a linear motor, having a secondary part developed as a guideway stator, and at least one secondary part that is movable with respect to the primary part, the generation of a magnetic field causing the motion is controlled in the primary part by the at least one secondary part.

In the method, a linear motor described herein may be used. For the control, one may use the possibilities that are described in connection with the linear motor.

Further features and aspects of example embodiments of the present invention are described in more detail below with reference to the appended Figures.

It goes without saying that the features indicated above, or that are yet to be clarified in the following, are usable not only in the combination specified in each instance, but also in other combinations or by themselves, without departing from the scope hereof.

Hereinafter, example embodiments of the present invention and particularly its advantages will be explained in greater detail on the basis of an illustrated exemplary embodiment shown in the figures.

DETAILED DESCRIPTION

Figure 1:
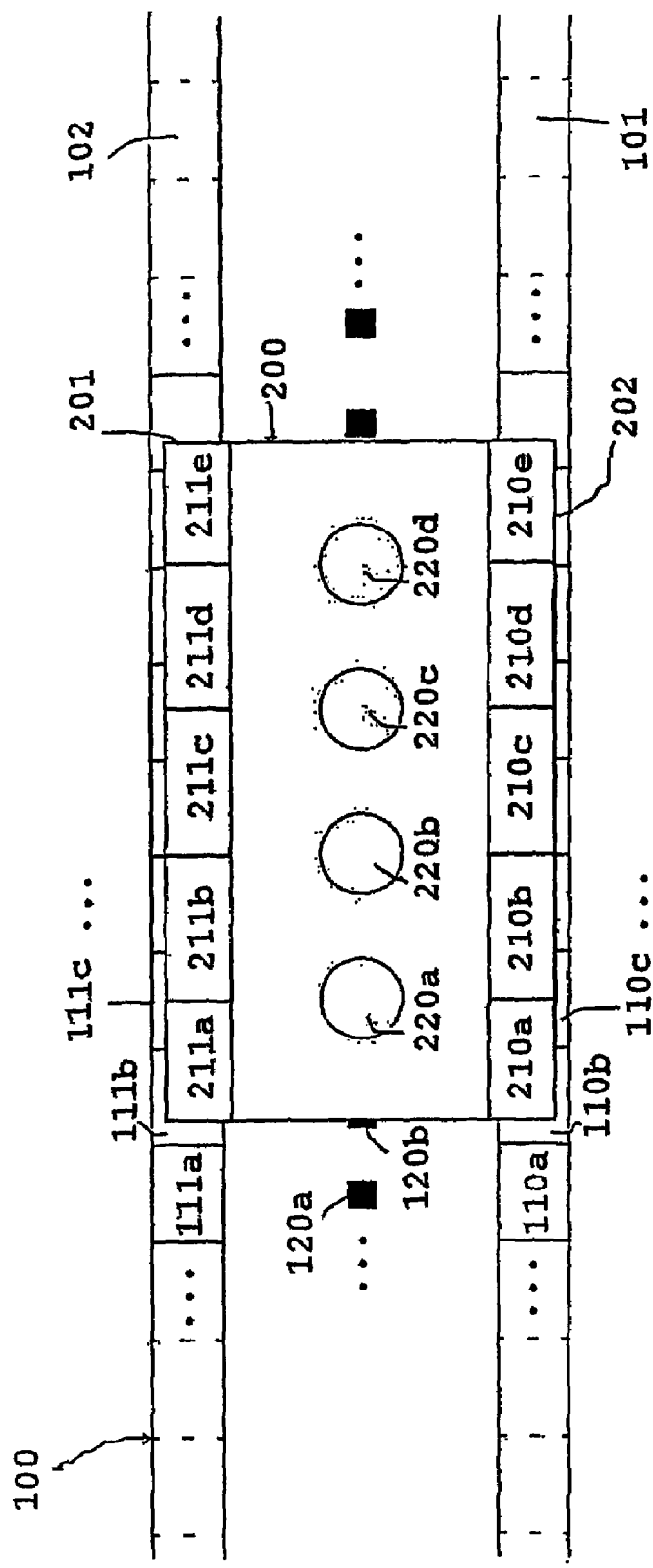
FIG. 1 is a schematic top view of a linear motor according to an example embodiment of the present invention.

A linear motor according to an example embodiment of the present invention shown in FIG. 1 has a primary part 100 and a secondary part 200. Primary part 100 has two drive rails 101 and 102 that are essentially designed identically. Magnetic field sensors 120a, 120b, etc. are situated on the center axis of the primary part. It should be understood that the specifically shown positioning is only to be seen as an example.

Drive rail 101 has individual coils 110a, 110b, etc., and drive rail 102 has individual coils 111a, 111b, etc. The opposite individual coils 110a and 111a, 110b and 111b, etc., are aligned coaxially with respect to magnetic field sensors 120a, 120b, etc., other arrangements being also able to be selected besides this one. It should be understood that the drive rails, depending on their length, can have a plurality of individual coils and magnetic field sensors above and beyond the number shown.

Each individual magnetic field sensor 120a, 120b, etc., is responsible for the control of the application of current to each respective individual coil pair 110a and 111a; 110b and 111b, etc.

For example, magnetic field sensor 120a controls the application of current of individual coils 110a and 111a, etc.

Additional device(s) for energizing, such as amplifier circuits, current sources, etc., are provided, which are not shown in detail, however, for the sake of clarity.

Secondary part 200 has travel rails 201 and 202 associated with drive rails 101 and 102. Besides that, the secondary part has control coils 220a through 220d, which enter into operative connection with magnetic field sensors 120a, 120b, etc., via a generated controlled field.

Travel rails 201 and 202 have individual permanent magnetic sections 210a through 210e and 211a through 211e. Secondary part 200 can move freely on primary part 100 along drive rails 101 and 102. The magnetic operative connection of drive rails 101, 102 with travel rails 201, 202 provides the feed functionality of the linear motor. The support and guidance of secondary part 200 on primary part 100 is not shown in greater detail. It can be managed, for instance, by additional magnetic rails or rollers.

Figure 2:
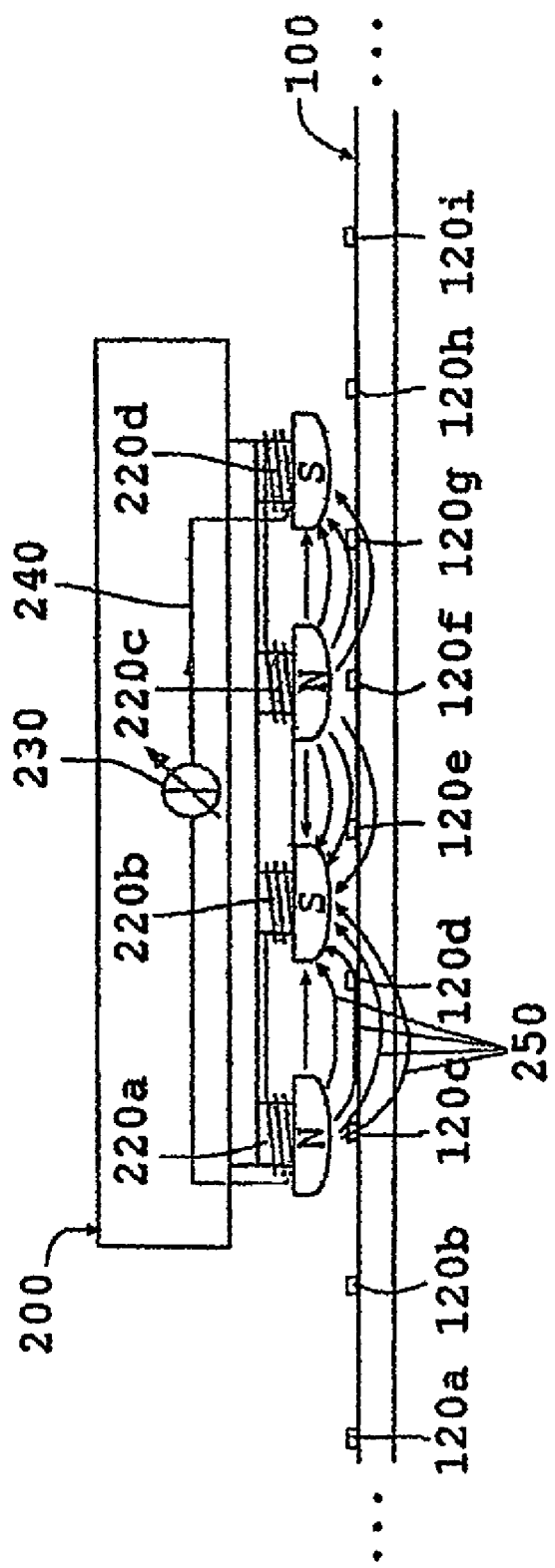
FIG. 2 is a schematic side view in cross section along the center axis of FIG. 1.

FIG. 2 shows a cross sectional view of the linear motor described above, along its center axis. Primary part 100 is situated underneath secondary part 200.

Magnetic field sensors 120a through 120i are situated on primary part 100, at regular intervals. Control coils 220a through 220d are situated on primary part 200 at regular intervals. The regular spacing of the control coils does not correspond to the regular spacing of the magnetic field sensors, in this example embodiment.

The subdivisions between permanent magnet sections 210a through 210e and 211a through 211e (FIGS. 1 and 3) may be aligned along the centers of control coils 220a through 220d.

Secondary part 200 has a control device 230 which is connected to control coils 220a through 220d via a connection 240, especially a cable, and which is able to apply current to the control coils.

In the figure shown, the control coils have current applied to them whose direction is indicated both by the arrow in control unit 230 and by the arrow on connection 240. In this current direction, control coils 220a and 220c form a magnetic north pole at their lower side, and control coils 220b and 220d form a magnetic south pole at their lower side.

Between control coils 220a through 220e a magnetic alternating field is created which is designated as control field 250. The spatial distribution of control field 250 is specified by the geometry and the situation of control coils 220a through 220d. The amplitude of magnetic control field 250 is specified by the amplitude of the current which the control coils have applied to them. The control unit controls the amplitude of the current through the control coils.

Control field 250, which is shown by the field lines in the figure, enters into operative connection with magnetic field 120a, 120b, etc. The intensity of the magnetic field recorded in the magnetic field sensors is a function of the distance of the magnetic field sensors from control coils 220a through 220d.

In this example, magnetic field sensors 120c and 120f are permeated by strong magnetic fields, substantially vertically from top to bottom, whereas magnetic field sensors 120d, 120e, 120g and 120h are permeated by weaker magnetic fields, slantwise from bottom to top. The respectively recorded magnetic field strength in the vertical direction (or rather, the vertical component of the field) is used for controlling the application of current to the associated individual coils 110a, 110b, etc., as well as 111a, 111b, etc. Because of the sinusoidal development of the control field, a corresponding sinusoidal development of the drive field is achieved.

Figure 3:
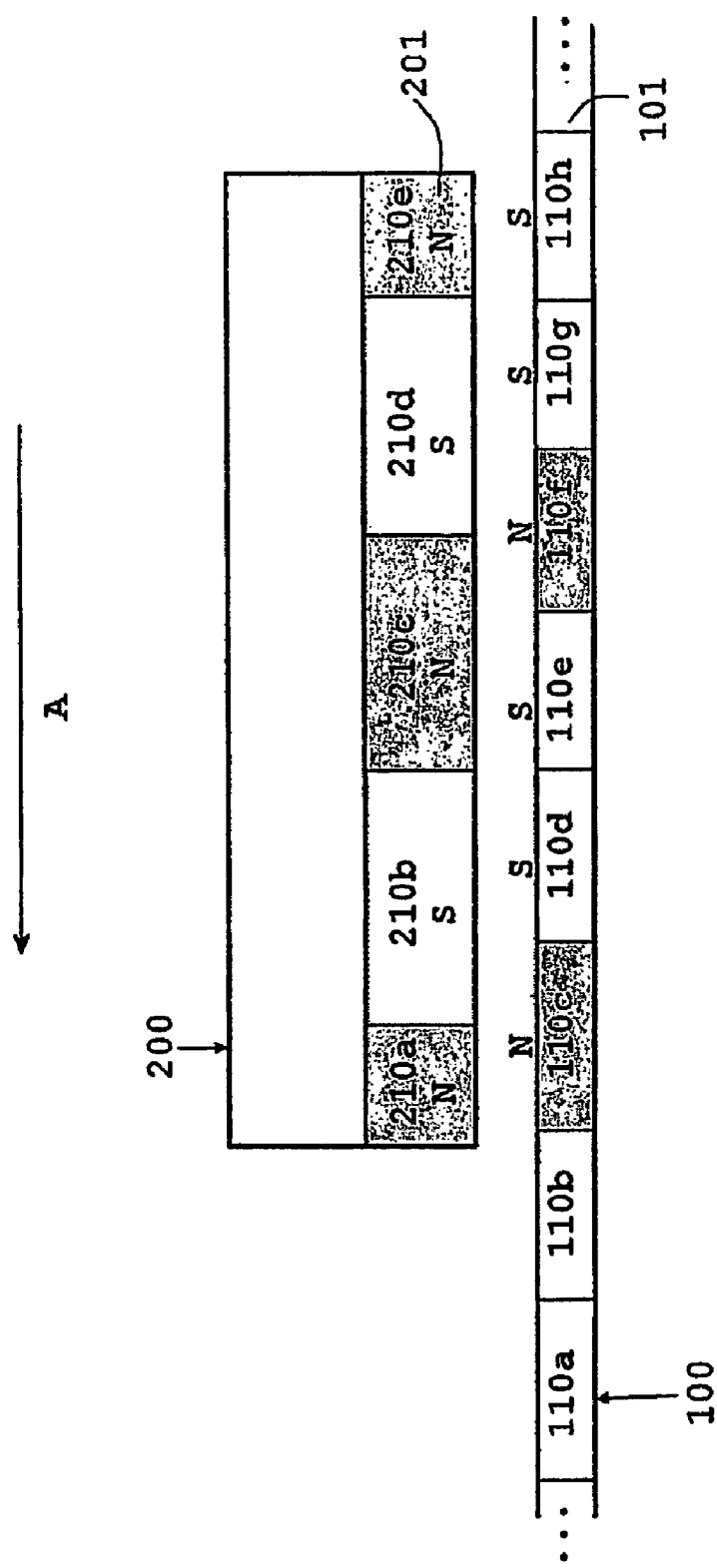
FIG. 3 is a schematic side view of the linear motor of FIG. 1.

FIG. 3 shows a side view of the example embodiment. Travel rail 201 of secondary part 200 is adjacent to drive rail 101 of primary part 100.

Drive rail 101 has individual coils 110a through 110h, whose respective current application is controlled by magnetic field sensors 120a through 120h (not shown in FIG. 3). Travel rail 201 is made up of permanent magnet sections 210a through 210e.

Sections 210a, 210c and 210e may have identical magnetic polarity, which is opposite to the polarity of sections 210b and 210e. In the example shown, sections 210a, 210c, 210e have a magnetic north pole, whereas sections 210b and 210d have a magnetic south pole. The magnetic field that starts from sections 210a through 210e is designated here as a permanent field.

The application of current to individual coils 110a through 110h is controlled by magnetic field sensors 120a through 120h, according to the manner shown in FIG. 2 and described. According to that, individual coils 110a through 110h have current applied to them in such a way that coils 110c, 110f develop a magnetic north pole field and coils 110b, 110d, 110e, 110h develop a magnetic south pole field of different strengths, and, in the overall picture, a substantially sinusoidal magnetic drive field or traveling field is created.

The operative connection of the magnetic drive field with the permanent field sets secondary part 200 in the motion indicated by arrow A, with respect to primary part 110. The control field is moved along with the secondary part. The motion of the control field leads to a propulsion of the drive field, also along direction A, whereby, in turn, the secondary part is moved further.

The feed force (acceleration) of the secondary part is a function of the strength of the drive field, which is specified by the strength of the current applied to individual coils 110a through 110h. As was explained, this current strength is specified by the strength of the control field, which depends on the current given off by control device 230 to control coils 220a through 220d. A change in the speed of motion can consequently be provided in a simple manner by a change in the current that is output by control unit 230.

A change in the direction of motion can be provided in the same manner, by a simple change in the current direction by control coils 220a through 220d. Using such a change in the current direction, the polarity of the control field, and thus the polarity of the drive field, reverse themselves. Since the polarity of the permanent field is maintained, there is a resultant change in the direction of motion.

It should be understood that in the figures shown, only an example embodiment of the linear motor is shown. Besides that, any other specific embodiment is possible, particularly due to a different positioning of the drive rails, positioning of the individual coils, positioning of the travel rails, construction and positioning of the control coils, positioning of the magnetic field sensors, etc., without leaving the scope hereof.

What is claimed is:

1. A linear motor, comprising:
 a primary part arranged as a guideway stator; and
 at least one secondary part movable with respect to the primary part;
 wherein the at least one secondary part includes a device configured to control generation of a magnetic field causing its motion in the primary part, and
 wherein the primary part includes a number of individual coils strung together, which are configured to have current applied to them independently of one another so as to generate a magnetic field, and the magnetic field causing the motion of the at least one secondary part being generatable in the primary part by application of current to the individual coils.

2. The linear motor according to claim 1, wherein the at least one secondary part is configured to control generation of the magnetic field causing its motion in the primary part by a control field distributed along a direction of propulsion.

3. A linear motor, comprising:
 a primary part arranged as a guideway stator; and
 at least one secondary part movable with respect to the primary part;
 wherein the at least one secondary part includes a device configured to control generation of a magnetic field causing its motion in the primary part,
 wherein the at least one secondary part is configured to control generation of the magnetic field causing its motion in the primary part by a control field distributed along a direction of propulsion, and
 wherein the control field, provided by the at least one secondary part, when associated with an individual coil is measured locally, and the measured value is used as a current setpoint value for the individual coil.

4. The linear motor according to claim 1, wherein a magnetic field is provided as a control field by the at least one secondary part.

5. The linear motor according to claim 1, wherein an electrical field is provided as a control field by the at least one secondary part.

6. A linear motor, comprising:
 a primary part arranged as a guideway stator; and
 at least one secondary part movable with respect to the primary part;
 wherein the at least one secondary part includes a device configured to control generation of a magnetic field causing its motion in the primary part, and
 wherein generation of the magnetic field causing the motion is controlled in the primary part by modulated electromagnetic waves.

7. The linear motor according to claim 6, wherein at least one of (a) a wavelength and (b) a polarization of the electromagnetic waves are used for the control.

8. A method for operating a linear motor having a primary part arranged as a guideway stator and at least one secondary part that is movable with respect to the primary part, comprising:
 controlling generation of a magnetic field, which causes motion of the secondary part in the primary part, by the at least one secondary part;
 wherein the primary part includes a number of individual coils strung together, which are configured to have current applied to them independently of one another so as to generate a magnetic field, and wherein the magnetic field causing the motion of the at least one secondary part is generatable in the primary part by application of current to the individual coils.

9. The method according to claim 8, wherein the at least one secondary part is configured to controls generation of the magnetic field causing its motion in the primary part by a control field distributed along a direction of propulsion.

10. A method for operating a linear motor having a primary part arranged as a guideway stator and at least one secondary part that is movable with respect to the primary part, comprising:
 controlling generation of a magnetic field, which causes motion of the secondary part in the primary part, by the at least one secondary part;
 wherein the at least one secondary part is configured to controls generation of the magnetic field causing its motion in the primary part by a control field distributed along a direction of propulsion, and
 wherein the control field, provided by the at least one secondary part, when associated with an individual coil is measured locally, and the measured value is used as a current setpoint value for the individual coil.

11. The method according to claim 8, wherein a magnetic field is provided as a control field by the at least one secondary part.

12. The method according to claim 8, wherein an electrical field is provided as a control field by the at least one secondary part.

13. A method for operating a linear motor having a primary part arranged as a guideway stator and at least one secondary part that is movable with respect to the primary part, comprising:
controlling generation of a magnetic field, which causes motion of the secondary part in the primary part, by the at least one secondary part;
wherein generation of the magnetic field causing the motion is controlled in the primary part by modulated electromagnetic waves.

14. The method according to claim 13, wherein at least one of (a) a wavelength and (b) a polarization of the electromagnetic waves are used for the control.

15. The linear motor according to claim 2, wherein generation of the magnetic field causing the motion is controlled in the primary part by modulated electromagnetic waves, and wherein at least one of (a) a wavelength and (b) a polarization of the electromagnetic waves are used for the control.

16. The linear motor according to claim 2, wherein the control field, provided by the at least one secondary part, when associated with an individual coil is measured locally, and the measured value is used as a current setpoint value for the individual coil, and wherein one of the following is satisfied: (i) an electrical field is provided as a control field by the at least one secondary part, and (ii) a magnetic field is provided as a control field by the at least one secondary part.

17. The linear motor according to claim 16, wherein generation of the magnetic field causing the motion is controlled in the primary part by modulated electromagnetic waves, and wherein at least one of (a) a wavelength and (b) a polarization of the electromagnetic waves are used for the control.

* * * * *